UNITED STATES PATENT OFFICE.

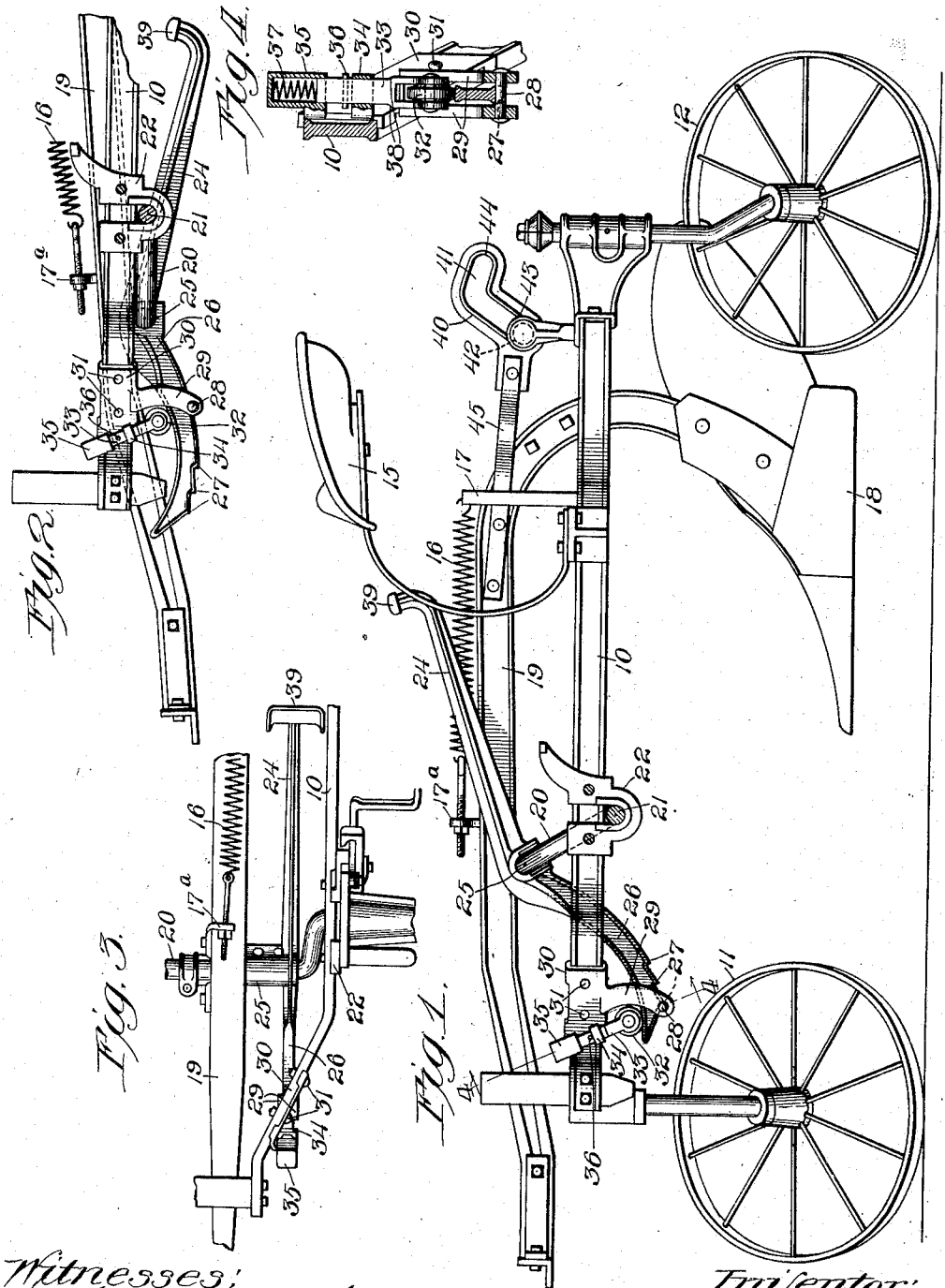

FRANK E. DAVIS, OF LA CROSSE, WISCONSIN, ASSIGNOR OF ONE-HALF TO ALBERT HIRSHHEIMER, OF LA CROSSE, WISCONSIN.

PLOW.

1,015,301.  Specification of Letters Patent.  Patented Jan. 23, 1912.

Application filed July 28, 1911. Serial No. 641,097.

*To all whom it may concern:*

Be it known that I, FRANK E. DAVIS, a resident of La Crosse, in the county of La Crosse and State of Wisconsin, have invented certain new and useful Improvements in Plows, of which the following is a full, clear, and exact description.

The invention relates to plows and designs to provide improved and simple mechanism whereby the operator, by foot action, may operate the plow to lower it and force it into the ground.

The invention consists in the novel features hereinafter set forth and more particularly defined by claims at the conclusion hereof.

In the drawings: Figure 1 is a side elevation of a plow, embodying the invention, the land-wheel and connected mechanism being omitted, and the mechanism for lowering the plow being shown in the position assumed when the plow is in raised position. Fig. 2 is a similar view, parts being broken away, showing the plow-lowering mechanism in position assumed when the plow is lowered. Fig. 3 is a plan, parts being broken away. Fig. 4 is a section taken on line 4—4 of Fig. 1, on a larger scale.

10 denotes the supporting frame sustained by the usual front furrow wheel 11, the rear furrow or caster-wheel 12 and the land-wheel 13 in any suitable manner, as well understood in the art. A plow 18 is secured to a beam 19 which is pivotally connected at its front to a crank 20 on a shaft 21, which is journaled in suitable bearings 22 on the frame. The rear of the plow is controlled by a roller 42 and guide-bracket 40 having a cam slot 41 and seats 43 and 44 therein which cause the rear end of the plow to rise and fall in response to the operation of crank 20. Guide 40 is secured to the plow-beam by braces 45. An operator-seat 15 is mounted on the frame. A balancing spring 16 is connected, at its rear, to a bracket 17 secured to the frame, and at its front, to a lug 17ª on the plow-beam.

The improved plow operating mechanism is applied to lower the plow and force it into the ground, and comprises a foot-lever 24 which is fulcrumed, as at 25, on the crank 20, so that as the lever-fulcrum is shifted, crank 20 will be shifted to lower the plow. The front end 26 of lever 24 is curved and its lower side is provided with a series of teeth or stops 27, which are adapted to engage a fixed stop-pin 28 secured in a forked extension 29 of a bracket 30 which is secured to the frame by bolts 31. Each of the teeth is adapted to engage the stop-pin 28 to hold the lever against forward movement, so that the lever will secure the crank 20 and the plow connected thereto, against downward movement. A roller 32 is oppositely disposed with respect to the stop 28 and is journaled in a forked plunger 33. This plunger is slidably mounted in a lug 34 on bracket 30 and in a spring-housing 35, also formed on said bracket. A stop-pin 36 limits the downward movement of the plunger in its guides, and a spring 37 in said housing engages the upper end of the plunger to hold the roller 32 in engagement with the front arm 26 of the foot-lever. Thus, the front portion of the lever is normally held between the fixed stop 28 and abutment 32, and the latter yieldingly holds the lever in engagement with stop 28. The plunger 33 is provided with projections 38 which are adapted to engage the bracket lug 34, to positively arrest the stop and hold it in fixed relation to the frame, when the rear end of the foot-lever is depressed and the teeth 27 of the foot-lever are released from the stop 28.

When the plow lowering mechanism is in the position shown in Fig. 1 and the operator places his foot upon the foot-piece 39 at the rear end of foot lever 24, initial pressure will cause the front end of the foot-lever to shift the abutment and roller 32 against the force of spring 37 until its movement is arrested by projections 38 engaging the lug 34. The foot-lever will then be unlocked from the stop 28 and further downward pressure upon the rear end of foot-lever 24 will cause the crank 20 on which the lever is pivoted to be forced downwardly, while the front end of the lever is held against upward movement by bearing on the arrested abutment 32 and the lever, as the crank 20 travels forwardly and downwardly, will ride on the roller and the lever-fulcrum 25 will approach the roller, as crank 20 is lowered, thus causing the leverage to gradually increase as the plow approaches the ground, and so that as the plow enters the ground, the lever will be working on a short radius between roller 32 and the lever-fulcrum 25. Therefore, this simple mechanism serves to effectively lower the plow and provides efficient and increased leverage at the time, when greater power is necessary to cause the plow to enter the soil. The sweep of the rear end of the foot lever is such that the plow may be conveniently operated.

It will be understood that any suitable mechanism may be employed for raising the plow, as well understood in the art, and since such mechanism forms no part of the present invention, it has not been deemed necessary to describe it in detail. When the crank 20 is operated to raise the plow, the foot-lever will be restored to its normal position and if it is not desired to raise the plow, to the extent illustrated, the operation of the plow-lifting mechanism will be discontinued so that one of the teeth 27 will engage the lever and hold the plow in corresponding position.

The invention is not to be understood as restricted to the details shown and described, since these may be modified within the scope of the appended claims, without departing from the spirit and scope of the invention.

Having thus described the invention, what I claim as new and desire to secure by Letters Patent, is:

1. In riding plows, the combination of a frame, a plow carried thereby, a foot-lever having a traveling fulcrum connected to the plow so that the plow will be operated as the fulcrum is shifted, a fixed stop on the frame for holding the lever in position to secure the plow, and an abutment for said lever and on which it travels as the lever is operated to shift the plow.

2. In riding plows, the combination of a frame, a plow carried thereby, a plow operating crank, a foot-lever fulcrumed on the crank so that the plow will be operated as the lever fulcrum is shifted, a fixed stop on the frame for holding the lever in position to secure the plow, and an abutment engaged by said lever and on which it travels as the lever is operated to shift the plow.

3. In riding plows, the combination of a frame, a plow carried thereby, a foot-lever having a traveling fulcrum connected to the plow so that the plow will be operated as the lever-fulcrum is shifted, a fixed stop on the frame for holding the lever in position to secure the plow, a yielding abutment for engaging said lever to hold it in engagement with said stop, and means for positively limiting the movement of the abutment by the lever, the latter having a traveling engagement with said abutment as the lever is shifted to operate the plow.

4. In riding plows, the combination of a frame, a plow carried thereby, a crank connected to the plow, a foot-lever fulcrumed on the crank so that the plow will be operated as the lever fulcrum is shifted, a fixed stop on the frame for holding the lever in position to secure the plow, a yielding abutment engaged by the lever and on which the lever travels, and means for positively limiting the movement of the abutment to limit the movement of the lever as it moves on the abutment.

5. In riding plows, the combination of a frame, a plow carried thereby, a foot-lever having a traveling fulcrum connected to the plow so that the plow will be operated as the fulcrum is shifted, a fixed stop on the frame for holding the lever in position to secure the plow, means on the lever for engaging the stop to hold the lever in different positions, and an abutment engaged by said lever, and on which it travels as the plow is operated by the lever.

6. In riding plows, the combination of a frame, a plow carried thereby, a plow-operating crank, a foot-lever fulcrumed on the crank so that the plow will be operated as the lever fulcrum is shifted, a fixed stop on the frame for holding the lever in position to secure the plow, means on the lever for engaging the stop to hold the lever in different positions, and an abutment engaged by said lever and on which it travels as the plow is operated by the lever.

7. In riding plows, the combination of a frame, a plow carried thereby, a foot-lever having a traveling fulcrum connected to the plow, so that the plow will be operated as the lever fulcrum is shifted, a fixed stop on the frame for engaging one side of the lever to hold it in position to secure the plow, and an abutment disposed at the opposite side of the lever and engaged thereby, said abutment being held in fixed relation to the frame when the foot-lever is out of engagement with the stop, the lever being provided with a part for traveling on the abutment as the lever is shifted about its fulcrum.

8. In riding plows, the combination of a frame, a plow carried thereby, a crank connected to the plow, a foot-lever fulcrumed on the crank so that the plow will be operated as the lever fulcrum is shifted, a fixed stop on the frame for engaging one side of the lever to hold it in position to secure the plow, and an abutment disposed at the opposite side of the lever and engaged thereby, said abutment being held in fixed relation to the frame, when the foot-lever is operated out of engagement with the stop, the lever being provided with a part for traveling on the abutment as the lever is shifted about its fulcrum.

9. In riding plows, the combination of a frame, a plow carried thereby, a foot-lever having a traveling fulcrum connected to the plow, so that the plow will be operated as the lever-fulcrum is shifted, a fixed stop on the frame for holding the lever in position to secure the plow, an abutment slidably mounted on the frame and engaged by the lever, the latter traveling on the abutment as it is operated to shift the plow, and means for limiting the movement of the abutment by the lever.

10. In riding plows, the combination of a frame, a plow carried by the frame, a crank connected to the plow, a foot-lever fulcrumed on the crank so that the plow will be operated as the lever fulcrum is shifted, a fixed stop on the frame for holding the lever in position to secure the plow, an abutment slidably mounted on the frame and engaged by the lever, the latter traveling on the abutment as it is operated to shift the plow, and means for limiting the movement of the abutment by the lever.

11. In riding plows, the combination of a frame, a plow carried thereby, a foot-lever having a traveling fulcrum connected to the plow so that it will be operated as the lever-fulcrum is shifted, a fixed stop on the frame for holding the lever in position to secure the plow, means on the lever for engaging the stop to hold it in different positions, an abutment slidably mounted on the frame and engaged by the lever, the latter traveling on the abutment as it is operated to shift the plow, and means for limiting the movement of the abutment.

12. In riding plows, the combination of a frame, a plow carried thereby, a foot-lever having a traveling fulcrum connected to the plow so that the plow will be operated as the lever fulcrum is shifted, a fixed stop on the frame for holding the lever in position to secure the plow, a roller slidably connected to the frame and on which the lever travels as it is shifted to operate the plow, and means for limiting the movement of the roller to cause it to remain in fixed relation to the frame when the lever is forced against it.

13. In riding plows, the combination of a frame, a plow carried thereby, a crank connected to the plow, a foot-lever fulcrumed on the crank so that the plow will be operated as the lever-fulcrum is shifted, a fixed stop on the frame for holding the lever in position to secure the plow, a roller slidably connected to the frame against which the lever travels as it is shifted to operate the plow, and means for limiting the movement of the roller to cause it to remain in fixed relation to the frame when the lever is forced against it.

14. In riding plows, the combination of a frame, a plow carried thereby, a foot-lever having a traveling fulcrum connected to the frame so that the plow will be operated as the lever-fulcrum is shifted, a bracket fixed on the frame and having a bifurcated arm, a stop at the lower end of said arm for holding the lever in position to secure the plow, and an abutment oppositely disposed with respect to the stop, said lever being mounted to slide between said stop and said abutment as it is operated to shift the plow.

15. In riding plows, the combination of a frame, a plow carried thereby, a foot-lever having a traveling fulcrum connected to the frame so that the plow will be operated as the lever-fulcrum is shifted, a bracket secured to the frame and having a bifurcated arm, a stop at the lower end of said arm for holding the lever in position to secure the plow, a plunger slidably mounted in said bracket, and having an abutment at its lower end adapted to be engaged by the lever, a spring for pressing said plunger toward the lever, and means for limiting the movement of the plunger by the lever so that the lever will travel on said abutment as the plow is operated.

FRANK E. DAVIS.

Witnesses:
FRED GERLACH,
C. W. DICKINSON.

---

Copies of this patent may be obtained for five cents each, by addressing the "Commissioner of Patents, Washington, D. C."